United States Patent

Ashrafi et al.

[11] Patent Number: 5,809,434
[45] Date of Patent: Sep. 15, 1998

[54] METHOD AND APPARATUS FOR DYNAMICALLY DETERMICALLY DETERMINING AN OPERATING STATE OF A MOTOR VEHICLE

[75] Inventors: Behrouz Ashrafi, Dearborn; Darrel Alan Recker, Belleville, both of Mich.

[73] Assignee: Ford Global Technologies, Inc., Dearborn, Mich.

[21] Appl. No.: 638,628

[22] Filed: Apr. 26, 1996

[51] Int. Cl.$^6$ .................................. B62D 7/15; B60T 8/72
[52] U.S. Cl. ............................ 701/1; 701/37; 701/72; 701/48; 180/197; 280/707
[58] Field of Search .................. 701/1, 37, 38, 701/39, 41, 42, 43, 48, 72, 74; 180/446, 422, 197; 280/707

[56] References Cited

U.S. PATENT DOCUMENTS

| | | | |
|---|---|---|---|
| 4,470,124 | 9/1984 | Tagami et al. | 364/571.02 |
| 4,679,808 | 7/1987 | Ito et al. | 701/1 |
| 4,882,693 | 11/1989 | Yopp | 701/37 |
| 4,927,170 | 5/1990 | Wada | 280/707 |
| 5,123,497 | 6/1992 | Yopp et al. | 180/422 |
| 5,311,431 | 5/1994 | Cao et al. | 701/72 |
| 5,321,616 | 6/1994 | Okuda et al. | 701/37 |
| 5,608,631 | 3/1997 | Tsutsumi et al. | 701/74 |

FOREIGN PATENT DOCUMENTS

| | | |
|---|---|---|
| 0-663-333-A1 | 7/1995 | European Pat. Off. . |
| 41-23-234-C1 | 8/1992 | Germany . |
| 42-28-893-A1 | 3/1994 | Germany . |
| 43-40-719-A1 | 6/1995 | Germany . |
| 195-02-858-C1 | 7/1996 | Germany . |
| 2262416 | 10/1990 | Japan . |
| 2-151-569 | 11/1990 | Japan . |
| 5000616 | 1/1993 | Japan . |
| 5193322 | 8/1993 | Japan . |
| 6230123 | 8/1994 | Japan . |
| 6288876 | 10/1994 | Japan . |
| 8216644 | 8/1996 | Japan . |

*Primary Examiner*—Tan Q. Nguyen
*Attorney, Agent, or Firm*—Gregory P. Brown

[57] ABSTRACT

A system for dynamically determining an operating state of a motor vehicle for input to a controller employed to control dynamics of the motor vehicle includes sensors for measuring predetermined vehicle operating state. The system also includes a device for predicting a value for the predetermined operating state, which can then be used to determine a correction factor for the measured operating state signal. This correction factor is proportional to the erroneous component of the measured vehicle operating state. Together, measured operating state and the correction signal are used to obtain a compensated operating state signal. This is particularly useful for reducing the effects of sensor drift and DC offset.

12 Claims, 4 Drawing Sheets

METHOD AND APPARATUS FOR DYNAMICALLY DETERMICALLY DETERMINING AN OPERATING STATE OF A MOTOR VEHICLE

BACKGROUND OF THE INVENTION

1. Field of the Invention

This invention relates to a vehicular system for dynamically determining an operating state of a motor vehicle. More particularly, the present invention relates to dynamically compensating measured signals and determining therefrom a control signal for controlling an operating dynamic of a motor vehicle.

2. Disclosure Information

It is well known to control various operating dynamics of a motor vehicle. For instance, it is known that a braking system may be modulated to maintain vehicle stability during braking. Similarly, traction control has been employed to enhance vehicle stability during acceleration. Active and semi-active suspension components have been proposed for eliminating or resisting vehicle lean and pitch during cornering, braking and acceleration. A more recent development has been to combine the control of various devices to provide overall control of the operating dynamics of the motor vehicle.

This enhanced operation of the various controlled devices has placed a great demand on accuracy and response time of various sensors used to monitor the dynamic operating state of motor vehicle. Longitudinal and lateral accelerometers, yaw rate sensors, etc. are all incorporated at great expense to provide this information to the vehicle control system. It has been determined that it would be desirable to provide a low cost sensor suite for a motor vehicle control system that can provide accurate, reliable data rapidly to the system controller.

It is an object of the present invention to provide a system for rapidly and accurately determining an operating state of a motor vehicle.

It is another object of the present invention to provide a yaw rate signal that is dynamically compensated for sensor drift and DC offset.

It is yet another object of the present invention to provide a lateral acceleration signal that is dynamically compensated for sensor drift and DC offset.

It is a further object of the present invention to dynamically determine a lateral velocity signal representative of a lateral velocity component of the motor vehicle.

It is an advantage of the present invention that a minimum number of sensors and estimation techniques are combined to determine the dynamic operating condition of the motor vehicle.

It is a further advantage of the present invention that an operating state determining system according to this invention could be used in conjunction with a driver warning system, a brake control system, a suspension control system, a vehicle speed control system, a steering gear power assist control system, or yet other types of vehicular systems.

Other objects, features, and advantages of the present invention will become apparent to those skilled in the art to which this invention pertains.

SUMMARY OF THE INVENTION

A system for dynamically determining an operating state of a motor vehicle for input to a controller employed to control dynamics of the motor vehicle includes an operating state measuring sensor for producing a first signal corresponding to the operating state of the motor vehicle and an operating state predicting algorithm for producing a second signal representing a prediction of the operating state. The system further includes a correction algorithm for producing a third signal representing an erroneous component of the first signal. The first and third signals are then input to a compensator device for removing the third signal from the first signal to obtain a fourth signal which accurately represents the operating state and which is then output to the controller for controlling the dynamics of the motor vehicle.

Additionally, a method for dynamically determining a yaw rate of a motor vehicle for input to a controller employed to control dynamics of the motor vehicle includes several steps, including measuring a right wheel speed and producing a right wheel speed signal and measuring a left wheel speed and producing a left wheel speed signal. The method also includes measuring a measured yaw rate and producing a first signal corresponding thereto and predicting a predicted yaw rate and producing a second signal corresponding thereto. The method further includes producing a third signal representing an erroneous component of the first signal and dynamically compensating the first signal by subtracting the third signal therefrom, thereby producing a fourth signal which accurately represents the yaw rate for use by the controller.

DETAILED DESCRIPTION OF THE INVENTION

Vehicle stability control may be enhanced if operating state variables can be rapidly and accurately determined during operation of the motor vehicle. For example, it has been discovered that significant improvements in the accuracy of yaw rate and lateral acceleration data can be achieved using data acquired through sensors to filter the erroneous components from the measured signals of interest. The resultant speed and accuracy of the compensated yaw and lateral acceleration signals is sufficient to accurately determine a lateral velocity signal therefrom.

Information from a system according to the present invention may be used to control a variety of vehicle functions. For instance, a system according to the present invention may be used for directly intervening in the operation of the vehicle by limiting the maximum speed or forward acceleration of the vehicle. The system may additionally apply individual brake actuators to impart an appropriate amount of vehicle yaw to compensate for inadequate vehicle response to an operator input. In the event that a vehicle having the present system is equipped with an adjustable suspension system including, for example, variable damping capability, or variable spring rate capability, or both, it may be desirable, to limit the adjustability of the suspension system under certain conditions indicated by the operating state of the vehicle.

Figure 1:
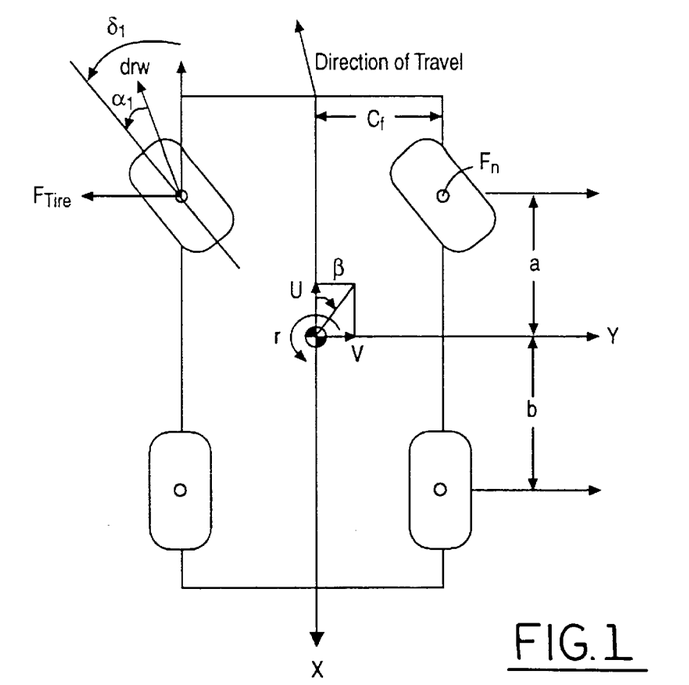
FIG. 1 is a free body diagram illustrating the various operating parameters of a motor vehicle during a turning maneuver.

FIG. 1 illustrates the various parameters with which a system according to this invention operates. Turn angle, $\delta_1$, is a measure of the steering angle at which the left front steered road wheel is positioned. This is a function of the steering wheel position as input by a vehicle operator. Longitudinal velocity, U, is a measure of the forward velocity of the vehicle. Lateral velocity, V, is a measure of the lateral velocity of the vehicle. Yaw rate, r, is a measure of the rate of rotation of the vehicle about a vertical axis. Slip angle, $\alpha_1$ is a measure of the angle between the steered angle of the road wheel and the direction of travel of the road wheel, $d_{rw}$. Normal force, Fn is the force usually associated with the vehicle's static weight, which acts downwardly through the road wheel and tire; however, it may be defined to include dynamic changes due to pitch and roll. Finally, tire lateral force, $F_{tire}$, is a measure of the lateral tire force developed at the interface of the tire with the road.

Figure 2:
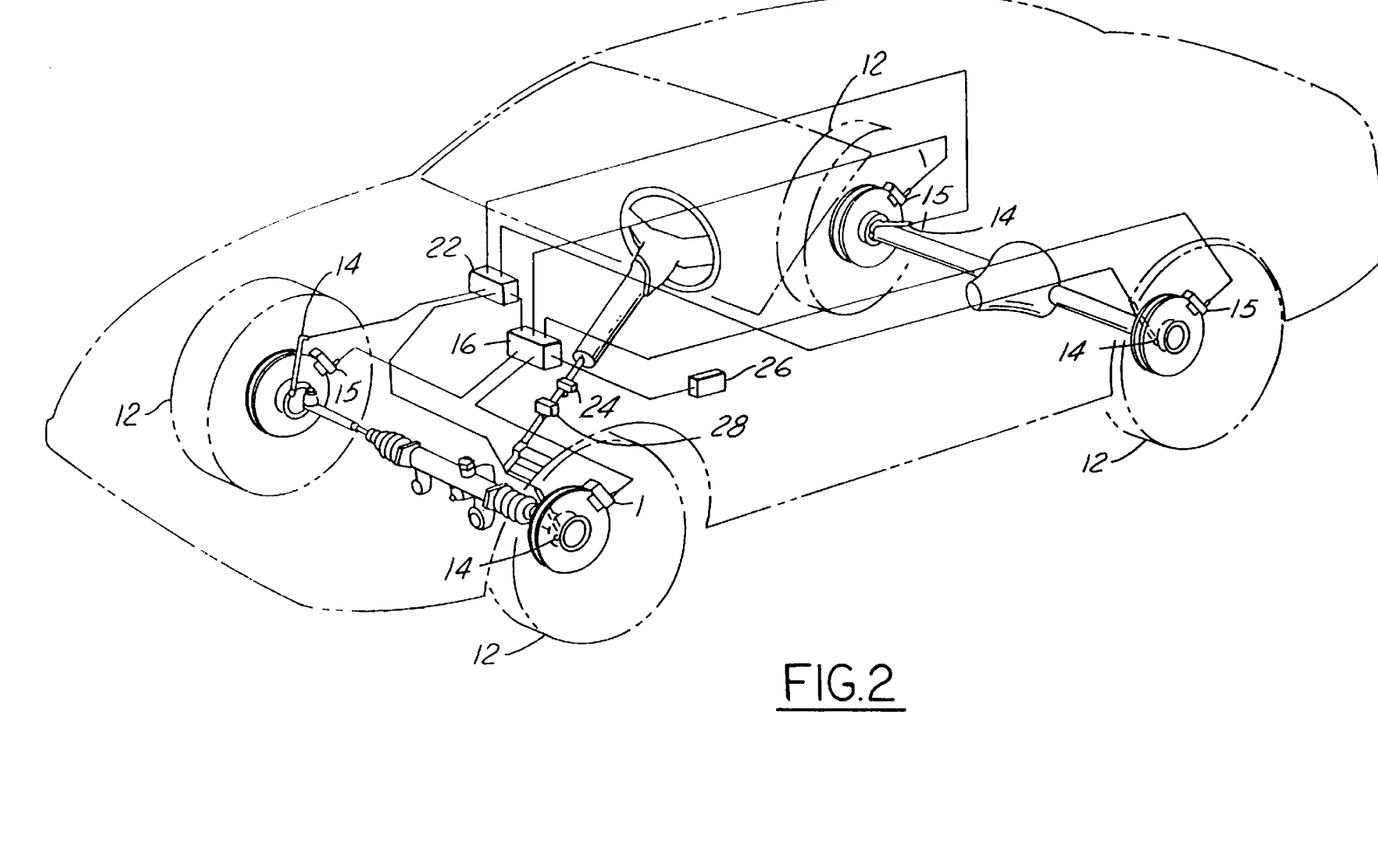
FIG. 2 is a perspective drawing of a motor vehicle incorporating the present invention. This figure shows some of the various components of a system embodying the present invention.

As shown in FIG. 2, a vehicle equipped with a system for dynamically determining an operating state of a motor vehicle according to the present invention includes a plurality of road wheels, 12, in this case four in number. A control module, 16, receives signals from various sensors within the vehicle and operates various devices such as brake actuators 15. The principal sensors from which control module 16 receives information are speed sensors 14 through speed module 22, steering angle sensor 24, yaw rate sensor 26 and lateral acceleration sensor 28.

Although many types of automotive speed sensors are known, one type suitable for use with a system according to the present invention comprises a speed module 22 for receiving input from speed sensors 14 located at each of the four wheels. The speed module derives a longitudinal vehicle speed signal by combining the signals from the speed sensors 14. One such type of speed signal module 22 is embodied in ABS brake control modules presently used in Ford Motor Company vehicles. The individual wheel speeds are ascertained using pulse generators disposed at each wheel in a conventional manner.

Figure 3:
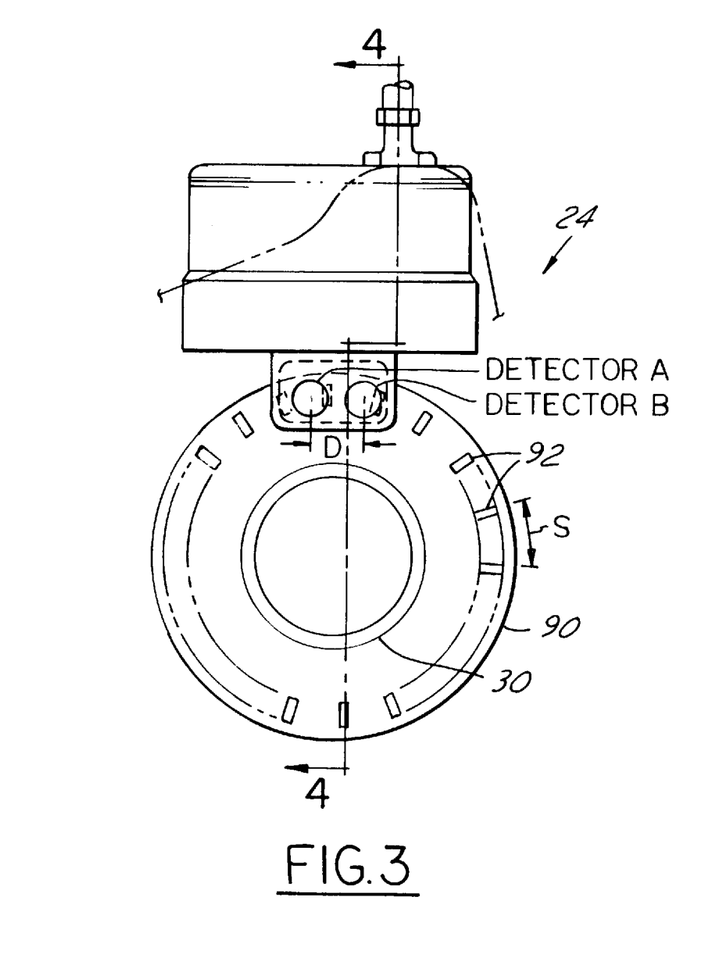
FIGS. 3 and 4 illustrate a turn angle sensor suitable for use with an embodiment of the present invention.
Figure 4:
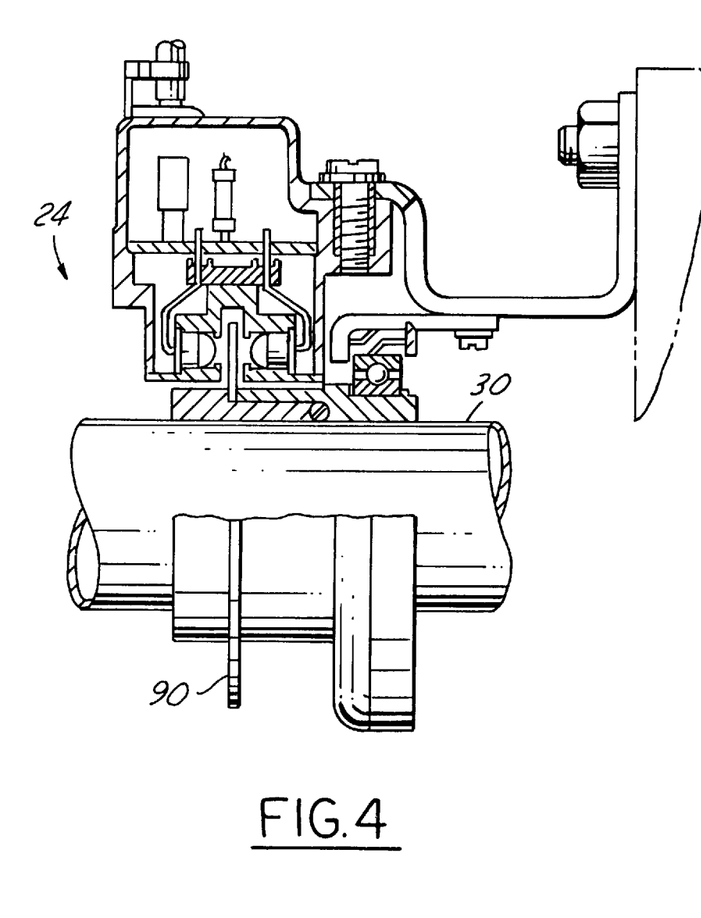

An example of a steering angle sensor suitable for use according to the present invention is shown in FIGS. 2, 3 and 4. Usage of the illustrated turn angle sensor is explained in U.S. Pat. No. 4,621,833, which is assigned to the assignee of the present invention, and which is hereby incorporated by reference. In general, the sensor illustrated in FIGS. 3 and 4 cooperates with control module 16 to produce a first signal representing the turn angle, $\delta_{sw}$, corresponding to the angle a steering wheel 32 is turned by the operator. From the steering angle $\delta_{sw}$, the actual steered angles $\delta_1$ and $\delta_2$ for the left and right front steerable road wheels can be mathematically determined in accordance with a mechanical steering ratio for the vehicle.

Steering angle sensor 24 includes means for measuring $\delta_{sw}$ from a center position determined by the steering angle sensor in conjunction with control module 16. As shown in FIGS. 3 and 4, turn angle sensor 24 comprises shutter wheel 90, attached to steering shaft 30, which rotates in unison with the steering wheel as the steering wheel is turned by the operator of the vehicle. Shutter wheel 90 has a plurality of apertures 92, in this case 20 in number, which apertures serve to trigger the activity of detectors A and B as the shutter wheel is rotated with the steering system of the vehicle. Because there are 20 apertures contained within shutter wheel 90, the steering angle sensor provides a signal 80 times during one revolution of the steering wheel and as a result each of the 80 signals or steps indicates 4.5 degrees of rotation of the steering system. It should be recognized that higher resolution may be obtained by increasing the number of apertures.

The outputs of detectors A and B are fed into control module 16 and in this manner the control module is allowed to track the rotation by counting the number of 4.5 degree steps the system has rotated from a predetermined center position. Those skilled in the art will appreciate in view of this disclosure that the illustrated steering angle sensor is exemplary of a class of devices which may be used for the purpose of determining the steering angle and for providing a signal representative of the steering angle to the control module. For example, it would be possible to employ a rotary slide wire potentiometer, or other known devices, for this purpose.

There are many yaw rate sensors 26 and lateral acceleration sensors 28 available for use in vehicle control systems. A yaw rate sensor detects the rotational rate of the motor vehicle about a vertical axis and outputs a signal that is proportional to the vehicle rate of yaw in radians per second. One problem associated with some yaw rate sensors is electronic drift. This is a condition which, if not accounted for, would result in considerable accumulated error in the indicated yaw rate. An additional problem associated with the use of less expensive yaw rate sensors is referred to as DC offset. This condition causes a relatively constant error component in the output of the yaw rate sensor. In the presently preferred embodiment, a yaw rate sensor such as that available from Systron Donner/Inertial, 2700 Systron Drive, Concord, Calif. 94518, and specifically model AQRS-00075-204 has been determined to work advantageously in the present invention; however, drift and DC offset must be compensated for to provide maximum accuracy.

Lateral acceleration sensors provide a signal that is proportional to the lateral acceleration of the motor vehicle. Unfortunately, relatively low cost lateral acceleration sensors also suffer from drift and DC offset. In the presently preferred embodiment, a lateral acceleration sensor, such as chat available from Texas Instruments, 34 Forest Street, Attleboro, Mass. 02703, and specifically model EX3426-260 has been determined to work advantageously in the present invention. Here too, the problems of drift and DC offset must be accounted for to provide maximum accuracy.

Figure 5:
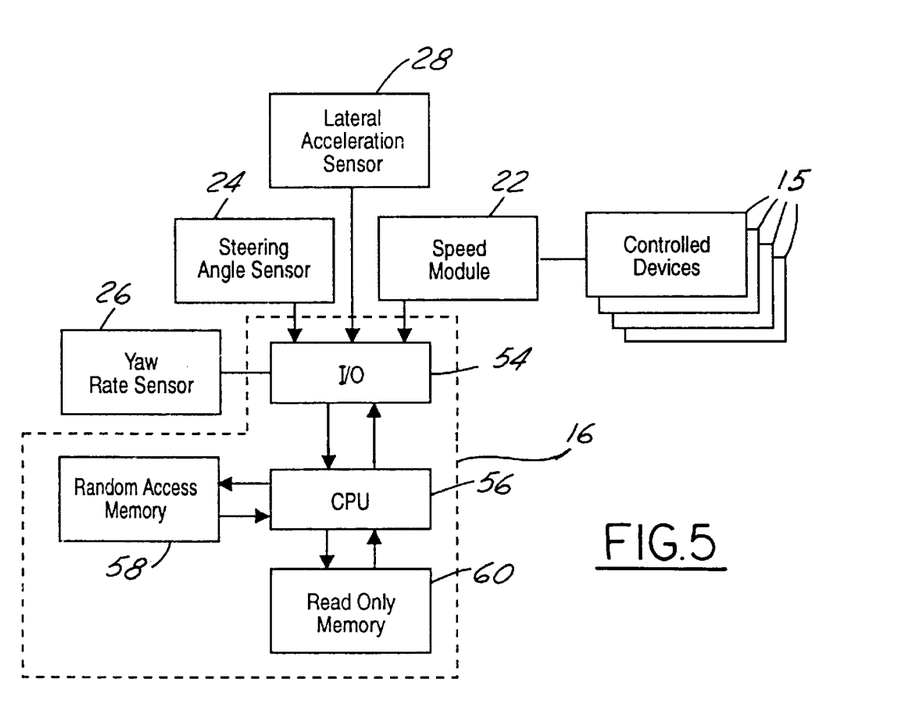
FIG. 5 is a block diagram showing a portion of a microprocessor and interconnected to sensors and controlled devices which may be included in a system according to the present invention.

Referring now to FIG. 5, a processor means within control module 16 operates on data provided by speed module 22, steering angle sensor 24, yaw rate sensor 26 and lateral acceleration sensor 28. Data from the speed module, steering angle, yaw rate and lateral acceleration sensors are fed into a central processor unit (CPU) 56, by means of input/output circuits (I/O), 54. Those skilled in the art will appreciate in view of this disclosure that the central processor and its associated peripheral equipment could be structured according to several known architectures. In a preferred embodiment, however, the processor is configured so that a control program is sequentially read for each unit command from a read-only memory (ROM), 60, which stores preset control programs. Unit commands are executed by the central processor. The I/O device serves to connect the balance of the microprocessor with the other components of the system, such as the sensors and control devices. A random access memory (RAM), 58, stores data for use by the CPU. A number of different microprocessors could be used to practice the present invention such as the Model 8096 made by the Intel Corporation, or other microprocessors known in the art.

Figure 6:
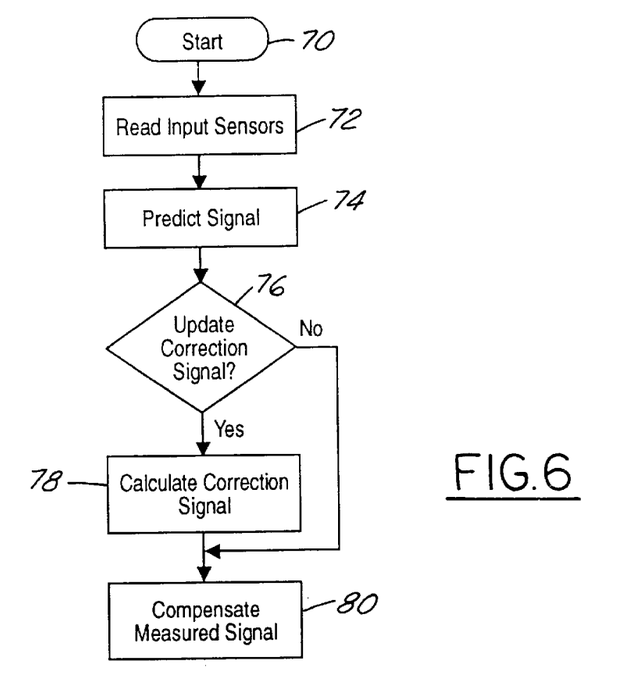
FIG. 6 is a logic flow block diagram in accordance with an embodiment of the present invention system.
Figure 7:
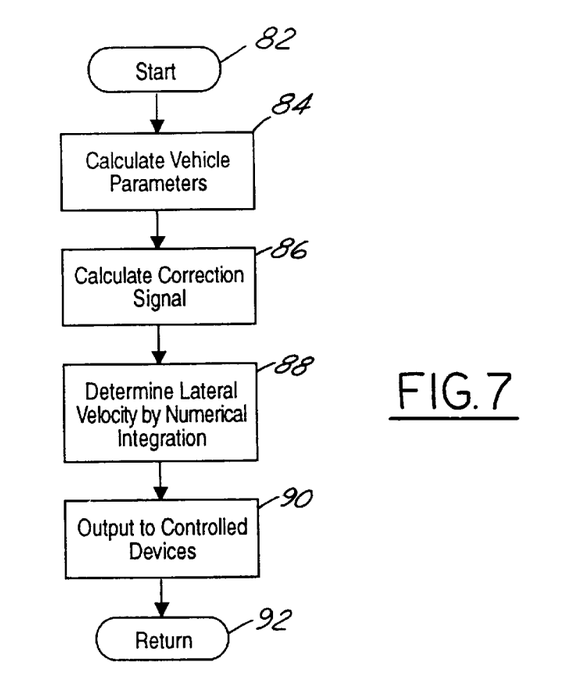
FIG. 7 is a logic flow block diagram in accordance with yet another embodiment of the present invention system.

The CPU processes data from the speed module, steering angle, yaw rate and lateral acceleration sensors according to the algorithms shown in FIGS. 6 and 7 to compensate yaw rate and lateral acceleration signals and to determine therefrom a lateral velocity signal for controlling the dynamics of the motor vehicle.

Generally with reference to FIG. 6, an algorithm is set forth for dynamically determining an operating state of a motor vehicle for use in the control module 16. Specifically, the application of that algorithm to dynamically determine a compensated yaw rate of the motor vehicle from a measured yaw rate signal, here the first signal, will now be described. Beginning at block 70, the CPU initializes variables from values permanently stored in ROM. At block 72, control module 16 gives the order to read the output from the various sensors, which in the preferred embodiment provides the individual wheel and vehicle longitudinal speeds ($L_{ws}$, $R_{ws}$, U) from the speed module 22, steering angle ($\delta_{sw}$) yaw rate ($r_{meas}$) and lateral acceleration ($A_{lat_{meas}}$). At block 74, a state predictor estimates a value expected for the measured operating state and generates a second signal corresponding to a predicted yaw rate, $r_{pred}$. The yaw rate is predicted according to the following relationship:

$$r_{pred} = \frac{L_{ws} - R_{ws}}{2Cf}$$

where Cf represents the orthogonal distance between a longitudinal axis extending through the center of gravity of the motor vehicle and the center of a tire contact patch, as projected onto the ground plane. This distance is approximately equal to one half of the distance between the centers of the left and right tires, also known as the track width.

At block 76 the control module makes a determination as to whether the motor vehicle is operating in a predetermined state for which reliable predictions may be made. With respect to predicting the yaw rate, it has been determined that the yaw rate prediction based on wheel speed difference is reliable for all times except when the ABS system is engaged to limit wheel slippage. When the ABS system is so engaged, an ABS event flag is set to "true", indicating that the predicted yaw rate should not be used. In this event, the control module advances to block 80. However, if the ABS event flag is "false", the control module advances to block 78 where a third signal is generated representing an erroneous component of the measured yaw rate signal. This signal may also be referred to as the yaw correction signal. The yaw correction signal is generated according to the following relationship:

$$Corr_r = W(s)(r_{meas} - r_{pred})$$

where W(s) is a transfer function having the form $$\frac{1}{\tau s + 1}.$$

As dictated by block 76, the yaw correction signal is only updated when the vehicle is operating in a predetermined state. In any event, the control module proceeds to block 80, where a fourth signal representing a compensated operating state signal is generated using the yaw correction signal. Specifically, at block 80, a compensated yaw rate, $r_{comp}$ is determined according to the following relationship:

$$r_{comp} = r_{meas} - Corr_r$$

The compensated signal can then be used by the CPU for further calculations and control of automotive devices, such as brake actuators. The processor would then return to block 72 and repeat the process.

In a similar fashion, a compensated lateral acceleration signal can be determined through the implementation of a similar algorithm. In fact, it should be understood that the previously described generic algorithm applies, and the only differences that will be described are the specific differences required to implement the generic algorithm for lateral acceleration rather than yaw rate. The first difference occurs at block 74 where the state predictor estimates a value expected for the measured operating state, and generates the second signal which in this case is the predicted lateral acceleration, $A_{lat_{pred}}$. The yaw rate is predicted according to the following relationship:

$$A_{lat_{pred}} = U(r_{comp})$$

Advantageously, the control module should predict lateral acceleration after determining the compensated yaw rate, $r_{comp}$, to obtain improved accuracy in $A_{lat_{pred}}$.

At block 76 the control module makes a determination as to whether the motor vehicle is operating in a predetermined state for which reliable predictions may be made. With respect to predicting the lateral acceleration, it has been determined that the lateral acceleration predictions based on $r_{comp}$ should only be used when $r_{comp}$ is less than approximately 0.5 radians per second. In the event $r_{comp}$ is greater than 0.5 radians per second, the control module jumps ahead to block 80. However, if the $r_{comp}$ is less than 0.5 radians per second the control module advances to block 78 where a third signal is generated representing an erroneous component of the measured yaw rate signal. This signal may also be referred to as the lateral acceleration correction signal.

The lateral acceleration correction signal is generated according to the following relationship:

$$Corr_A = W(s)(A_{lat_{meas}} - A_{lat_{pred}})$$

where W(s) is a transfer function having the form $$\frac{1}{\tau s + 1},$$

At block 80, a compensated lateral acceleration, $A_{lat_{comp}}$, is determined according to the following relationship:

$$A_{lat_{comp}} = A_{lat_{meas}} - Corr_A$$

Having good values for the lateral acceleration and the yaw rate, the control module may proceed to estimate the lateral velocity of the vehicle.

Referring now to FIG. 7, an algorithm for estimating the lateral velocity of the motor vehicle will be described. The algorithm starts at start block 82, which could be entered after the yaw rate and lateral acceleration signals have been compensated. The control module proceeds to block 84 and calculates a variety of vehicle operating parameters necessary to sufficiently describe the operating state of the vehicle at the given instant in time for which the data was acquired. One such operating parameter includes the lateral force existing at each tire. The tire lateral force, $F_{tire_{1-4}}$ can be determined according to the following relationship:

$$F_{tire_{1-4}} = +K_{tire}(\alpha_{1-4})(Fn_{1-4})$$

where $K_{tire}$ represents a tire property giving lateral force for a given slip angle and normal force, $\alpha_{1-4}$ represents the slip angle at each of the four respective tires and $Fn_{1-4}$ represents the normal force at each of the four respective tires. The normal force $Fn_{1-4}$ is initialized as a static design load, and in the preferred embodiment is dynamically updated in accordance with conventional vehicle dynamics equations derived for the specific suspension geometry to account for pitch and roll induced weight transfer. Additionally, it is contemplated that some type of load sensing apparatus could be used to directly determine the normal force at each of the four tires.

The slip angles, $\alpha_{1-4}$, may be determined according to the following relationships:

$$\alpha_1 = \delta_1 - \text{Tan}^{-1}\frac{(V-ar)}{(U+Cfr)}$$

where $67_1$ equals the steered angle for the given tire, as described above, V represents the lateral velocity of the vehicle, which for this purpose takes the value estimated on the previous pass through the algorithm, a is the distance from the center of gravity to the center of the front axle, r represents the yaw rate of the motor vehicle, U represents the longitudinal velocity of the vehicle, and Cf represents one half the track width, as described above. Essentially, this quotient can be considered to be a ratio of the lateral velocity of the tire and the longitudinal velocity of the tire, $$\frac{V_{i_{1-4}}}{U_{i_{1-4}}}.$$

The slip angle for the other wheels can be found according to the following relationships:

$$\alpha_2 = \delta_2 - \text{Tan}^{-1}\frac{(V-ar)}{(U-Cfr)}$$

$$\alpha_3 = \delta_3 - \text{Tan}^{-1}\frac{(V+br)}{(U-Cfr)}$$

$$\alpha_4 = \delta_4 - \text{Tan}^{-1}\frac{(V+ar)}{(U+Cfr)}$$

The control module then advances to block 86.

At block 86 the control module generates an observer corrector signal that is proportional to the difference in the measured lateral acceleration signal, $A_{lat_{meas}}$, and a signal representing an estimate of the lateral tire forces, $A_{tf}$. This corrector signal is generated according to the following relationship:

$$Corr_{obs} = k_{obs}(A_{lat_{meas}} - A_{tf})$$

where $k_{obs}$ represents an empirically determined observer gain developed in accordance with asymptotic observer theory. The control module advances to block 88, where the corrector signal is used to determine the estimate of the lateral velocity, V.

The control module generates a lateral velocity signal by numerically integrating the following relationship using the longitudinal speed, U, yaw rate, r, and the sum of the lateral tire forces, $\Sigma F_{tire_{1-4}}$, and corrector, $Corr_{obs}$ signals:

$$\dot{V} = -Ur + \frac{1}{m} \Sigma F_{tire_{1-4}} + Corr_{obs}$$

While it should be apparent to one skilled in the art, it should be mentioned that the yaw rate and lateral acceleration values used to evaluate the above expression can be used as directly measured. An advantage will be achieved, however, if those values are compensated in accordance with the above described algorithms. This prevents the integration of the error component contained in the measured signals, which becomes significant as it cumulates through the numerical integration process used to determine the lateral velocity estimate. The control module advances to block 90 where the lateral velocity can be used for controlling various dynamics of the motor vehicle through the controlled devices.

Referring back to FIG. 5, the controlled devices 12 will thereafter be given commands by I/O device 54. After giving a control command at block 90, the control module will return to start block 82 via return block 92 running the algorithms represented by FIGS. 6 and 7.

An example will serve to further demonstrate operation of a system according to the present invention. First, assume that a vehicle with the present system is being operated around a corner, the steering angle sensor will measure the angle of the steering wheel and the control module will determine the steered angles of the front wheels. Similarly, the individual wheels speeds will be ascertained from an existing ABS module, from which the vehicle longitudinal speed can also be determined. Additionally, the yaw rate sensor and lateral acceleration sensor will measure their respective data. This data represents the operating state of the motor vehicle for the instant in time at which the data was sampled. The control module will next go about determining the remaining data necessary to properly control the dynamics of the vehicle by controlling the various controlled devices with which the vehicle may be equipped.

It is advantageous if the control module proceeds to compensate the measured yaw rate signal first, as it will be used in the determination of several variables to be used in the ultimate determination of the lateral velocity of the vehicle at that instant. As such, the control module proceeds to determine a prediction of the yaw rate. With this value, the control module next determines a yaw rate correction signal. The yaw rate correction signal is then used to determine the compensated yaw rate, which at this point is a very accurate representation of the actual vehicle yaw rate.

It should be noted that had the ABS system been engaged when the data was acquired, the control module would have simply used the yaw rate correction signal determined prior to ABS engagement.

The control module then proceeds to determine the compensated lateral acceleration signal, using the compensated yaw rate signal. Much like the determination of the compensated yaw rate signal, the control module first predicts a lateral acceleration signal and generates a lateral acceleration correction signal therefrom. This lateral acceleration signal is then used to compensate the measured lateral acceleration signal, assuming that the compensated yaw rate is below a predetermined minimum. Presently, the best accuracy has been obtained using a value of 0.5 radians per second.

The control module can then use this data to determine the remaining vehicle parameters necessary for the determination of the lateral velocity. The control module determines the lateral tire forces by determining the normal forces and the slip angles for each tire. As mentioned earlier, the normal forces can be as simple as the static loading from ROM, or they can be estimated taking into account weight transfer due to pitch and roll. In the event of a suspension having force measuring means, the normal force may be read directly therefrom. The normal force and calculated slip angles for each tire can be used to provide an estimate of the lateral force being generated at the road/tire interface. These values, when summed and divided by the mass of the vehicle, represent yet another estimate of the lateral acceleration for the vehicle.

The control module then numerically integrates the data to determine the lateral velocity of the vehicle for that instant in time. The resulting signal is used, in combination with the other signals to more accurately control the dynamics of the vehicle through the various controlled devices.

For instance, the combination of yaw rate, lateral acceleration and lateral velocity would allow the ABS brake system to enhance vehicle stability during a turn. The control module could ascertain that the yaw rate, lateral acceleration and lateral velocity are not consistent with a drivers steering input, thereby requiring independent brake modulation to impart the appropriate yaw, lateral acceleration and lateral velocity for the given operator command. Additionally, the control module may determine that throttle intervention would further enhance the stability of the motor vehicle. Finally, the control module may also adjust roll stiffness, and other suspension parameters to transfer weight to wheels which could enhance stability.

Various modifications and variations will, no doubt, occur to those skilled in the arts to which this invention pertains. For example, the computer architecture described herein may be modified according to the individual needs of the system being designed. This system could be constructed using analog circuit devices rather than the illustrated digital devices. Similarly, the choice of which controlled devices to control using the signals is a choice within the province of the individual employing a system according to this invention. These and all other variations which basically rely on the teachings with which this disclosure has advanced the art are properly considered within the scope of this invention as defined by the following claims.

We claim:

1. A system for dynamically determining an operating state of a motor vehicle for input to a controller employed to control dynamics of the motor vehicle, said system comprising:

operating state measuring means comprising means for producing a first signal corresponding to an operating state of said automotive vehicle;

operating state predictor means comprising means for producing a second signal representing a prediction of said operating state;

correction means comprising means for producing a third signal representing an erroneous component of said first signal; and compensator means for removing said third signal from said first signal to obtain a fourth signal which accurately represents said operating state and providing said fourth signal to said controller, wherein said correction means updates said third signal when said vehicle is operating in a predetermined state and does not update said third signal when said vehicle is not operating in said predetermined state.

2. A system according to claim 1 wherein said correction means determines said third signal according to the following relationship:

$$Corr_r = W(s)(f_{meas} - f_{pred})$$

where:

$Corr_r$ = the error component represented by said third signal;

$W(s)$ = transfer function having the form $$\frac{1}{\tau s + 1};$$

$f_{meas}$ = first signal, as measured; and $f_{pred}$ = second signal, as predicted.

3. A system for dynamically determining a yaw rate of a motor vehicle for input to a controller employed to control dynamics of the motor vehicle, said system comprising:

right wheel speed measuring means for producing a right wheel speed signal corresponding a right wheel road speed;

left wheel speed measuring means for producing a left wheel speed signal corresponding a left wheel road speed;

yaw rate measuring means comprising means for producing a first signal corresponding to a measured yaw rate of said motor vehicle;

yaw rate predictor means comprising means for producing a second signal using said right and left wheel speed signals, said second signal thereby representing a predicted yaw rate of said motor vehicle;

correction means comprising means for producing a third signal representing an erroneous component of said first signal; and compensator means for removing said third signal from said first signal to obtain a fourth signal which accurately represents said yaw rate and providing said fourth signal to said controller.

4. A system according to claim 3 wherein said correction means determines said third signal according to the following relationship:

$$Corr_r = W(s)(f_{meas} - f_{pred})$$

where:

$Corr_r$ = the error component represented by said third signal;

$W(s)$ = transfer function having the form $$\frac{1}{\tau s + 1};$$

$r_{meas}$ = first signal representing the measured vehicle yaw rate; and $r_{pred}$ = second signal representing the predicted yaw rate.

5. A system according to claim 3 wherein said second signal, representing said predicted yaw rate of said motor vehicle is determined according to the following relationship:

$$r_{pred} = \frac{L_{ws} - R_{ws}}{2Cf}$$

$r_{pred}$ = second signal representing the predicted yaw rate;

$L_{ws}$ = Left wheel speed;

$R_{ws}$ = Left wheel speed; and $Cf$ = distance from the vehicle centerline to the center of the tire contact patch.

6. A system according to claim 3 wherein said correction means updates said third signal when said vehicle is operating in a predetermined state and does not update said third signal when said vehicle is not operating in said predetermined state.

7. A system according to claim 3 wherein said correction means updates said third signal when an ABS event flag is set false and does not update said third signal when said ABS event flag is set true, thereby ignoring right and left wheel speed signals during ABS events.

8. A method for dynamically determining a yaw rate of a motor vehicle for input to a controller employed to control dynamics of the motor vehicle, said method comprising the steps of:

measuring a right wheel speed and producing a right wheel speed signal;

measuring a left wheel speed and producing a left wheel speed signal;

measuring a measured yaw rate and producing a first signal corresponding thereto;

predicting a predicted yaw rate and producing a second signal corresponding thereto;

producing a third signal representing an erroneous component of said first signal; and dynamically compensating said first signal by subtracting said third signal therefrom, thereby producing a fourth signal which accurately represents said yaw rate for use by said controller.

9. A method according to claim 8, whereby said step of producing a third signal representing an erroneous component of said first signal includes obtaining said third signal by the following relationship:

$$Corr_r = W(s)(r_{meas} - r_{pred})$$

where:

$Corr_r$ = the error component represented by said third signal;

$W(s)$ = transfer function having the form $$\frac{1}{\tau s + 1};$$

$r_{meas}$ = first signal representing the measured vehicle yaw rate; and $r_{pred}$ = second signal representing the predicted yaw rate.

10. A method according to claim 8, wherein said step of predicting a predicted yaw rate and producing a second signal includes obtaining the second signal by the following relationship:

$$r_{pred} = \frac{L_{ws} - R_{ws}}{2Cf}$$

where:

$r_{pred}$ = second signal representing the predicted yaw rate;

$L_{ws}$ = Left wheel speed;

$R_{ws}$ = Left wheel speed; and

Cf = distance from the vehicle centerline to the center of the tire contact patch.

11. A method according to claim 8, wherein said step of producing said third signal representing said erroneous component of said first signal further comprises the steps of:

determining whether the vehicle is operating in a predetermined state; and updating said third signal only when said vehicle is operating in said predetermined state.

12. A method according to claim 11, wherein said step of determining whether the vehicle is operating in a predetermined state includes monitoring an ABS event flag, which is set false to indicate when said vehicle is operating within said predetermined state and true to indicate when said vehicle is operating outside of said predetermined state.

* * * * *